(12) United States Patent
Chaulk et al.

(10) Patent No.: US 7,395,497 B1
(45) Date of Patent: Jul. 1, 2008

(54) SYSTEM AND METHODS FOR PROCESSING LARGE DATASETS

(75) Inventors: Christopher A. Chaulk, Franklin, MA (US); Udi Bar-On, Jamaica Plain, MA (US); Xiaohua Cheng, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 325 days.

(21) Appl. No.: 10/701,167

(22) Filed: Oct. 31, 2003

(51) Int. Cl.
G06F 17/00 (2006.01)
G06F 17/27 (2006.01)
G06F 17/30 (2006.01)
G06F 7/00 (2006.01)

(52) U.S. Cl. .................. 715/200; 715/212; 715/213; 715/214; 715/220; 715/229; 715/238; 715/242; 715/252; 715/255; 707/1; 707/7; 707/200

(58) Field of Classification Search .............. 715/500, 715/503, 200, 212, 213, 214, 220, 229, 238, 715/242, 252, 255; 707/1, 7, 200
See application file for complete search history.

(56) References Cited

U.S. PATENT DOCUMENTS

| | | | | |
|---|---|---|---|---|
| 5,386,570 | A * | 1/1995 | Lindhorst | 717/146 |
| 5,867,166 | A * | 2/1999 | Myhrvold et al. | 345/419 |
| 6,332,163 | B1 * | 12/2001 | Bowman-Amuah | 709/231 |
| 6,615,253 | B1 * | 9/2003 | Bowman-Amuah | 709/219 |
| 6,631,346 | B1 * | 10/2003 | Karaorman et al. | 704/9 |
| 6,631,497 | B1 * | 10/2003 | Jamshidi et al. | 715/514 |
| 6,820,073 | B1 * | 11/2004 | Bedell et al. | 707/2 |
| 6,901,403 | B1 * | 5/2005 | Bata et al. | 707/101 |
| 7,017,112 | B2 * | 3/2006 | Collie et al. | 715/513 |
| 2002/0178140 | A1 * | 11/2002 | Woodmansee et al. | 707/1 |
| 2003/0023670 | A1 * | 1/2003 | Walrath | 709/203 |
| 2003/0126136 | A1 * | 7/2003 | Omoigui | 707/10 |
| 2004/0117381 | A1 * | 6/2004 | Yankovsky | 707/100 |
| 2004/0193646 | A1 * | 9/2004 | Cuckson et al. | 707/104.1 |
| 2005/0033723 | A1 * | 2/2005 | Selby et al. | 707/1 |

OTHER PUBLICATIONS

Masuishi et al.; "A Reporting Tool Using 'Programming by Example' For Format Designation"; ACM 2000; pp. 177-180.*
Holt et al.; "Efficient Mining of Association Rules in Text Databases";1999;ACM;pp. 234-242.*
Jin-Mao Wei; Wei-Guo Yi; Ming-Yang Wang; shu-Qin Wang, Data Feature Oriented Data Partition and Weighted Data Mining, Jun. 21-25, 2004, IEEE, pp. 287-291.*

* cited by examiner

Primary Examiner—Doug Hutton
Assistant Examiner—Chau Nguyen
(74) Attorney, Agent, or Firm—Chapin IP Law, LLC; Barry W. Chapin, Esq.

(57) ABSTRACT

In a storage area network (SAN) management application, large data sets tend to produce unwieldy results upon display attempts. A mechanism for gathering and organizing a large data set into an ordered set of output display entries which does not require main memory storage for the entire large data set, generates a displayable portion without excessive memory consumption. Configurations employ a multiple pass gathering and organization operation. An output criteria specifies a key field and identifies a range of entries by specifying a particular screen for display from among the full range of screens. A parser retrieves and identifies the entries, during a first pass, using only the key field and an index for each of the entries in the large data set, to avoid loading all fields of each entry in entirety. A second pass fetches entries only for the identified entries corresponding to the output criteria.

26 Claims, 9 Drawing Sheets

SYSTEM AND METHODS FOR PROCESSING LARGE DATASETS

BACKGROUND OF THE INVENTION

In a typical conventional managed information services network, such as a storage area network (SAN) operable to coordinate access to mass storage devices by a set of users, the storage area network interconnects a plurality of storage device nodes and associated interconnection nodes. The storage area network includes a variety of nodes for providing mass storage retrieval services to users, such as storage devices (e.g. disc drive arrays), connectivity devices (e.g. switches and routers), and conventional host computers for executing software components called agents for monitoring and controlling the nodes in the storage area network. The resultant infrastructure, therefore, for monitoring and controlling the storage area network, defines a complex array of nodes and interconnections.

Management of the storage area network infrastructure presents a formidable task. The multitude of nodes and interconnections between the various nodes present a substantial monitoring and control task for tracking throughput, identifying bottlenecks, and pinpointing failures, for example. In a typical conventional managed information services network, a network management application, such as a Simple Network Management Protocol (SNMP) based application, for example, assist operators and users in gathering feedback from the network and performing diagnostic activities for isolating problem areas, performing remedial action, and improving efficiency of the conventional network infrastructure.

SUMMARY

In a conventional managed information services network, status monitoring and reporting mechanisms typically monitor the various nodes and interconnections in the network. Such a network typically includes a large number of nodes, or manageable entities, for performing various operations and service in the network. Such manageable entities may include, for example, host nodes, software agent components, storage arrays, interconnection components including routers and switches, and others. The network interconnects the manageable entities for providing and manipulating throughput and providing services on behalf of users.

Such conventional information services networks include storage area networks, in which the deployed manageable entities provide user services for access to large scale mass storage devices such as disk arrays. The storage area network, therefore, provides information storage, indexing, and retrieval services to a relatively large user community for many gigabytes or terabytes of stored data. In such a storage area network, for example, a correspondingly large number of manageable entities may be deployed to provide high performance access for the users.

Typical conventional managed information systems, therefore, employ a management, monitoring, and control application for enabling an operator or operations staff to ensure continued high performance operation, and to quickly diagnose and troubleshoot areas of problems or potential problems. Such a conventional application typically provides reports and other feedback to the operator to observe the network performance. Typically such a report includes data expressed in a tabular, or chart, form on an output screen display. Such reports are typically paged or processed according to an output processing operation to quickly display areas and data of interest, and to avoid burdening the operator with voluminous, largely repetitive and cumulative data.

However, in a large managed information service network, there are typically a large number of managed entities. Accordingly, typical performance reports include data entries corresponding to a large number of manageable entities or other atomic, reportable item. Often, the number of entries which a user may request for display in a report exceeds the available display area. Accordingly, the storage area network management application attempts to organize the report entries into a sequence of pages for display to the operator.

Often, however, the number of entries is sufficiently large that organizing the report entries is a formidable task. Each report entry may correspond to a data entry of a substantial size. Further, the total number of entries for subdivision into pageable units is typically large. Accordingly, substantial memory and time resources may be required to organize a set of report entries into an ordered output set operable for paging, and further to display a particular page of entries which is of interest to the operator.

It would be beneficial, therefore, to develop a mechanism for gathering and organizing a large data set into an ordered set of output display entries which does not require main memory storage for the entire large data set and generates a pertinent, targeted, displayable portion in a timely manner. The large data set is typically organized into normalized entries. Organization typically takes the form of a sort or other operation on one or more fields in the entries. Display typically occupies a single screen of the display device, i.e. monitor. Accordingly, such a mechanism is operable to identify a large data set having entries for display, specify a sort operation on the entries, and specify a range within the entries for display, such as a particular number of a screen among the total continuum of screen entries operable for display (i.e. show screen 43 out of 100).

embodiments of the invention, therefore, are based on the observation that substantially large data sets tend to produce unwieldy and even inoperable results upon display attempts. Such large data sets may require the entire data set to be loaded into volatile storage (i.e. main memory) for sorting operations, prior to subdividing individual portions of the sorted, or organized, data for presentation. A particularly large data set, for example, may even exceed the available memory area and cause an operation to fail. Often, only a single entry or a single screen of data is then displayed to the operator. Configurations of the invention substantially overcome the above described shortcomings of processing large data sets for output display by employing a multiple pass gathering, organization and output operation. The method, described further below, identifies a key field for sorting each of the entries. An operator identifies an output criteria specifying the key field and identifies a range of entries by specifying a particular screen for display from among the full range of screens.

A parser retrieves and identifies the entries using only the key field and an index for each of the entries in the large data set, to avoid loading all fields of each entry in entirety. A processing handler, triggered by parser events, then subdivides the retrieved entries into display portions, and the handler identifies entries corresponding to the display screen identified in the operator requested output criteria. The processing handler identifies the indices of the records for display, and the parser performs a second pass for fetching the complete entry only for the identified entries corresponding to the output criteria. A sort handler receives the fetched entries from the second pass for the display output set, and sorts the entries accordingly for display on the operator output device (i.e. screen).

Given such a large dataset of elements, such as a set of XML elements having unique ID attributes, operable for sorting on a value contained within the elements and further subdivided into pages for page-oriented display on a single page output device, the technique disclosed herein provides a memory and time efficient method of sorting the data and determining which elements from the original dataset fit onto the page to be displayed. During a multiple pass operation, a first memory conservative sort on a subset of the data is followed by a memory consuming sort on a narrower and more refined subset in a second pass, through which the technique refines, narrows, and processes the elements, or entries, such that neither pass restricts memory, time, or processing resources substantially.

In further detail, the system of the present invention provides a method for organizing and generating report data indicative of a plurality of manageable entities in a storage area network by determining an output criteria applicable to a set of data to compute an ordered output display set adapted for inclusion in a report. A parser in an infrastructure monitor parses, in a first pass, a plurality of entries in the set of data. During the first pass, the parser applies the determined output criteria to a portion of each parsed entry to compute a subset of candidate entries. Next, the parser performs a second pass on the computed subset of candidate entries. During the second pass, the parser processes the computed subset of candidate entries according to the determined output criteria to generate the ordered output display set of entries, typically a single screen of output which the infrastructure monitor displays to a user on a display device, or console.

Memory efficiency of the sorting and parsing operations is facilitated by retaining in memory only the data corresponding to the selection and arrangement criteria fields in the first pass, and further by omitting from a memory, in the second pass, entries in the parsed plurality of entries outside the candidate set.

The determined output criteria defines a single screen's worth of data, and includes a selection criteria indicative of output records for inclusion in the candidate entries and an arrangement criteria indicative of display formatting applicable to the candidate entries. The selection criteria allows identification of data applicable to a single output screen, and therefore corresponds to a set of displayable entries operable for simultaneous display on an output device (i.e. display screen). The arrangement criteria is indicative of ordering logic, such as the sorting criteria, applicable to a subset of fields in which each of the displayable entries is based on a comparison of the fields in the entries. In the particular exemplary implementation shown, the ordering logic processes at least one of the fields (i.e. a key field) according to ascending or descending values. In the sorting example shown, the determined output criteria is operable on the key fields of the entries, in which the key fields have scalar values operable for comparison by the sort. However, alternate ordering logic may be employed.

The raw report data from which the parser operates, in an exemplary configuration, a set of data is arranged in a predetermined data set format, in which the data set format is operable to designate entries corresponding to rows and fields corresponding to columns, in a tabular or normalized format. This predetermined data set format may define a syntax having a nested structure conversant with a parser operable to perform the first parse and the second parse. Such a format, in the exemplary configuration, is the Extensible Markup Language (XML) format, in which the parser is further operable to extract entries and fields in each of the entries according to rows and columns.

Particular configurations further employ a filtering criteria, in which the filtering is operable to designate a subset of entries for inclusion in the first pass and the filtering criteria operable on at least one of the fields for comparison and selective inclusion in the designated subset. The first pass may therefore include filtering entries for omission from the candidate set and comparing key fields in entries for inclusion in the candidate set. The second pass then performs matching of entries for inclusion in the candidate set, sorting entries in the candidate set, and formatting entries in the candidate set for display on the output device.

Operation of the parser further includes generating parsing events for initiating callback operations, in which the callback operations are operable on the data set according to predetermined logic similar to a function call or interrupt. In accordance with the predetermined syntax, the parsing events may correspond to predetermined syntactical structures, in which the callback operations are operable for applying the determined output criteria on the entries in the data set. Such callback operations, in the example below, further include building the candidate set, filtering the entries in the data set, matching entries in the candidate set, sorting entries in the candidate set, and formatting entries in the candidate set.

Therefore, in a particular exemplary implementation, during the first pass, the parser scans elements of the dataset in entirety and unique ID information and information employed in the sort are extracted from each XML element (entry) and stored in memory. The remaining information from each entry is discarded during the first pass, to conserve memory. Following the first pass, the memory structures representing the entries are sorted on the extracted sort information from the first pass. Entries physically fitting on the display screen, according to a range computed from a start and end index from the sort, remain resident in memory, and entries not for display are discarded.

The second pass of the parser, which may in particular implementations be a Simple API for XML (SAX) parser, the parser scans the entries a second time, and entries matching the unique identifiers of entries remaining in the first pass are retained in memory, and the remaining entries discarded. Thus, the second pass, while retaining entire entries in memory, is operable to efficiently perform transforms on the entries because only entries corresponding to a single display page are sorted using the entire record inclusive of the fields of the record in entirety.

The invention as disclosed above is described as implemented on a computer having a processor, memory, and interface operable for performing the steps and methods for monitoring an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Particular configurations of the invention provide a method for gathering and organizing a large data set into an ordered set of output display entries which avoids employing main memory storage for the entire large data set and generates a pertinent, targeted, displayable portion in a timely manner. The large data set is typically received or obtained (fetched) as normalized entries. Organization as described herein typically takes the form of a sort or other operation on one or more fields in the normalized entries. The resultant ordered display output set, in the particular exemplary configuration shown below, occupies a single screen of the display device, i.e. monitor. Accordingly, the implementation discussed below identifies a large data set having entries for display, specifies a sort operation on the entries, and specifies a range within the entries for display, such as a particular number of a screen among the total continuum of screen entries operable for display (i.e. show screen 43 of 100).

In accordance with the present invention, in a managed information network, monitoring and diagnostic operations often involve large data sets which tend to produce unwieldy and even inoperable results upon display attempts. Such large data sets may require the entire data set to be loaded into volatile storage (i.e. main memory) for sorting operations, prior to subdividing individual portions of the sorted, or organized, data for presentation. Often, only a single entry or a single screen of data is then displayed to the operator. Configurations of the invention substantially overcome the above described shortcomings observable when processing large data sets for output display by employing a multiple pass gathering, organization and output operation.

The method, described further below, identifies a key field for sorting each of the entries. An operator identifies a sorting criteria, which specifies the key field, and identifies a range of entries by specifying or determining a screen index from among the full range of screens. A parser retrieves and identifies the entries using only the key field and an index for each of the entries in the large data set, to avoid loading all fields of each entry in entirety. A processing handler, triggered by parser events, subdivides the retrieved entries into display portions, and the handler identifies entries corresponding to the display screen identified in the operator requested output criteria. The processing handler identifies the indices of the records for display, and the parser performs a second pass for fetching the complete entry only for the identified subset of entries corresponding to the output criteria. A sort handler receives the fetched entries from the second pass for the display output set, and sorts the entries accordingly for display on the operator output device (i.e. screen).

The multiple pass method discussed further below avoids memory resource costs associated with sorting, particularly Extensible Style Sheet Language Transformation (XSLT) sorting of XML data, for paged display output by preceding the sort with a filtering and matching operation to reduce the sort entries and eliminate entries not to be displayed. A parser such as the SAX parser, in the exemplary configuration, is known in the art to provide efficient parsing of data according to the XML format. The multiple pass technique capitalizes on this efficiency and speed by performing, in the exemplary configuration, two passes over the XML document (e.g. data set file) including the data. The first pass sorts a memory resident representation of a minimal subset of the data to determine the entries operative to fit on the single requested output display page. The second pass follows the first pass and stores a full memory resident representation of the subset of entries in the data set for display on the single output page, and eliminates other entries so that the sorting operation, such as the exemplary XSL sort, need only operate on a single screen's worth of entries.

Figure 1:
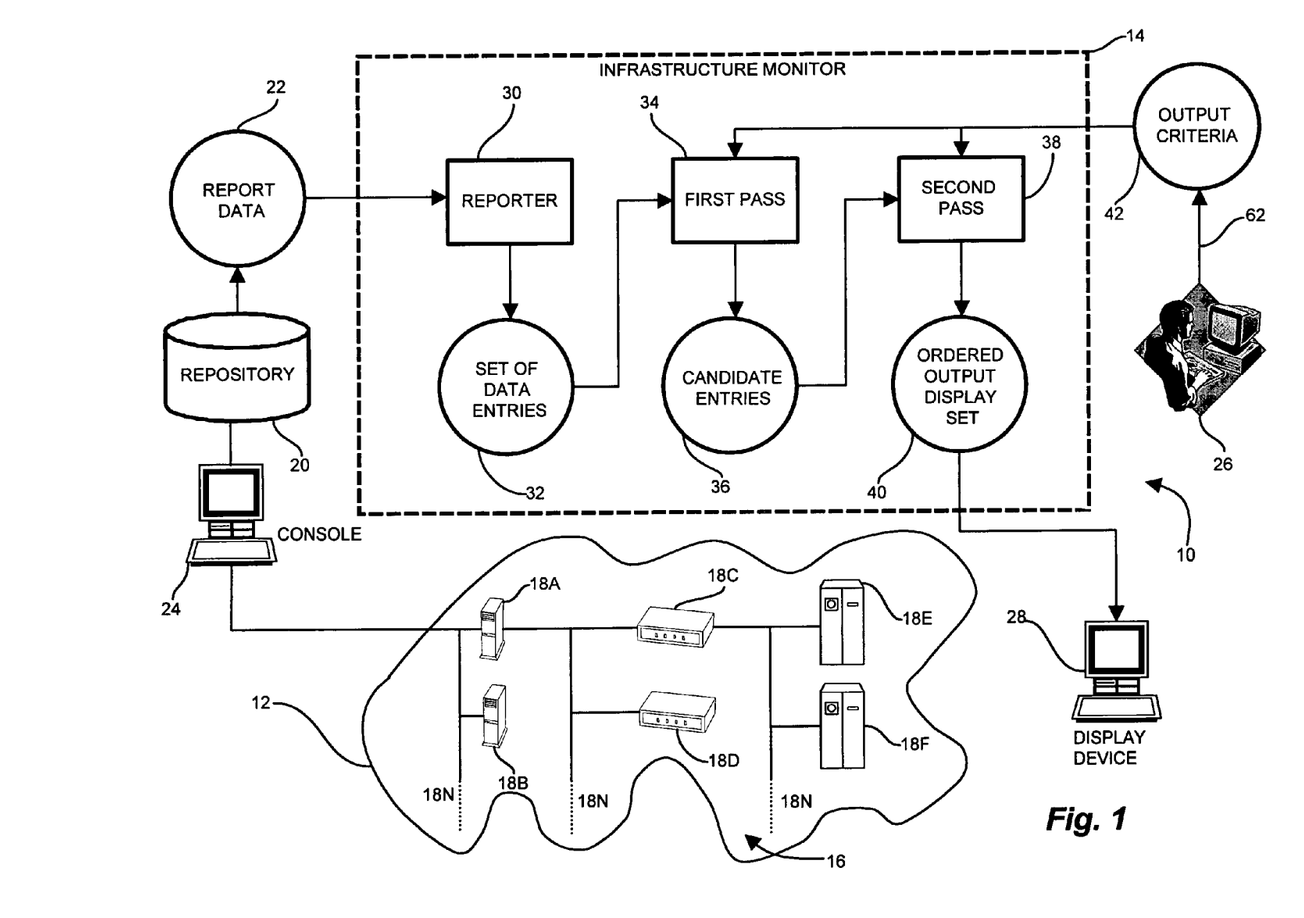
FIG. 1 is a data flow diagram of the raw data set from the repository through the SAN infrastructure monitor.

FIG. 1 is a data flow diagram of the raw data set from the repository through the SAN Infrastructure Monitor 14. Referring to FIG. 1, an exemplary managed information network 10, illustrated herein in conjunction with a storage area network (SAN) 12 interconnection, including multiple manageable entities 16, includes the infrastructure monitor 14. The infrastructure monitor 14 provides organization and generation of report data indicative of the manageable entities 16 in the storage area network 12. The manageable entities (MEs) 16 include SAN nodes 18A-18N operative to perform various SAN operations, and include host nodes 18A, 18B, connectivity nodes 18C-18D, and storage device nodes 18E-18F. Other nodes 18N operative to perform additional or other operations may be included in alternate configurations.

A repository 20 stores SAN 12 configuration report data 22 which includes a variety of performance, configuration, and diagnostic data concerning the manageable entities 16. An operator console 24 manages the SAN 12 by employing the report data 22 for management functions, and both reads and writes the report data 22. The infrastructure monitor 14 receives and processes the report data 22 to generate output display sets of data for presenting to a user 26 on an output display device 28.

The infrastructure monitor receives the raw report data via a reporter 30, which generates a normalized set of data entries 32. The set of data entries 32 may be in a format according to a textual format, such as a markup or scripting language, discussed further below as an exemplary configuration. The infrastructure monitor 14 receives an output criteria 42 from a user 26 which defines the ordered output display set 40 for display on the display device 28 according to user report specifications 62. The infrastructure monitor 14 performs a first pass 34 and generates a set of candidate entries 36 based on the output criteria. The infrastructure monitor performs a second pass 38 on the set of candidate entries 36 to generate the ordered output set 40.

In the data flow diagram of FIG. 1, the logical flow of the infrastructure monitor 14 is shown, as will now be discussed in further detail. The components 30, 34 and 38 define operations transforming the report data 22, and correspond to software processes having encoded instruction for performing the operations. The data items 32, 36 and 40 define the transformed data at various stages, also discussed further below.

Figure 2:
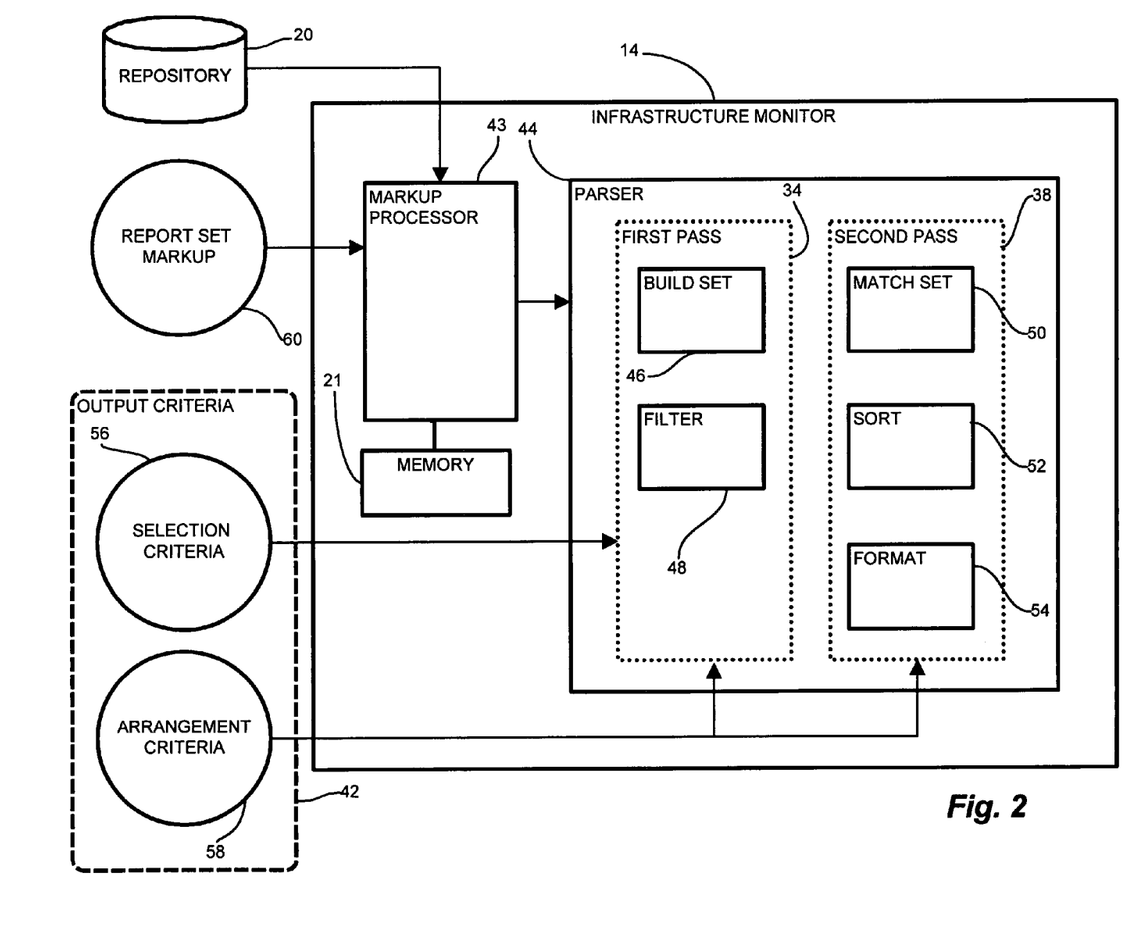
FIG. 2 is a block diagram of the infrastructure monitor.

FIG. 2 is a block diagram of the infrastructure monitor 14 in conjunction with an exemplary implementation in the network 10 employing an exemplary processing, or reporting, mechanism for normalizing the report data 22. Referring to FIGS. 1 and 2, the exemplary infrastructure monitor 14 includes a markup processor 43, corresponding to the reporter 30 of FIG. 1, and a parser 44. The parser 44 includes a memory 21 and handler components (handlers) for performing parsing operations, including a build set handler 46, a filter handler 48, a match set handler 50, a sort handler 52, and a format handler 54. The parser invokes the build set handler 46 and the filter handler 48 during the first pass 34, and invokes the match set 50, sort 52, and format 54 handlers during the second pass 38, discussed further below.

The markup processor 43 is operable to receive the report data 22 in the form of normalized report set markup 60. In the particular exemplary configuration illustrated, the report set markup 60 include data according to the Extensible Markup Language (XML), as is known to those of skill in the art. Alternative script and data formats, such as other forms of textual markup, and other structured data formats are employable in alternate configurations. The XML report set markups 60 are operable with the markup processor 43 and with the parser 44 for efficient invocation of the handlers 46, 48, 50, 52 and 54 via a callback mechanism, also discussed further below. The report set markups 60, as described herein, indicate a structured text data format operable for processing according to certain standards, such as the exemplary XML syntax described above, which is capable of representing normalized data due to the markup syntax which allows metadata in the form of tags accompanying the text based data to define structure.

The output criteria 42 derives from report specifications 62 input by a user 26 for identifying the parameters of the ordered output set 40. The output criteria 42 includes a selection criteria 56 and an arrangement criteria 58. The selection criteria 56 is operable to identify, in the first pass 34, a range of entries from among all entries in the report set scripts for inclusion in the ordered output set. The arrangement criteria 58 indicates a sorting or logical arrangement order, and specifies both the range of entries in the first pass 34 and the manner in which to process and sort the fields in the range, or subset, of entries identified in the first pass. It should be noted, however, that the arrangement criteria 58 corresponds to the selection criteria 56 in the first pass 34 because the selection criteria 56 effectively applies sorting or other logic to the entire data set 22 in determining inclusion in the candidate set 36. In operation, the first pass 34 employs the full report data set 22, operating on a subset of fields to determine the subset of candidate entries 36. The second pass 38 employs the determined subset 36 to process the full complement of fields in the entries, albeit for fewer entries than the entire set of entries in the report data 22. Therefore, neither the first pass 34 nor the second pass 38 need employ a full complement of fields in an entry for all entries in the report data 22 set, as will be discussed further below.

Figure 3:
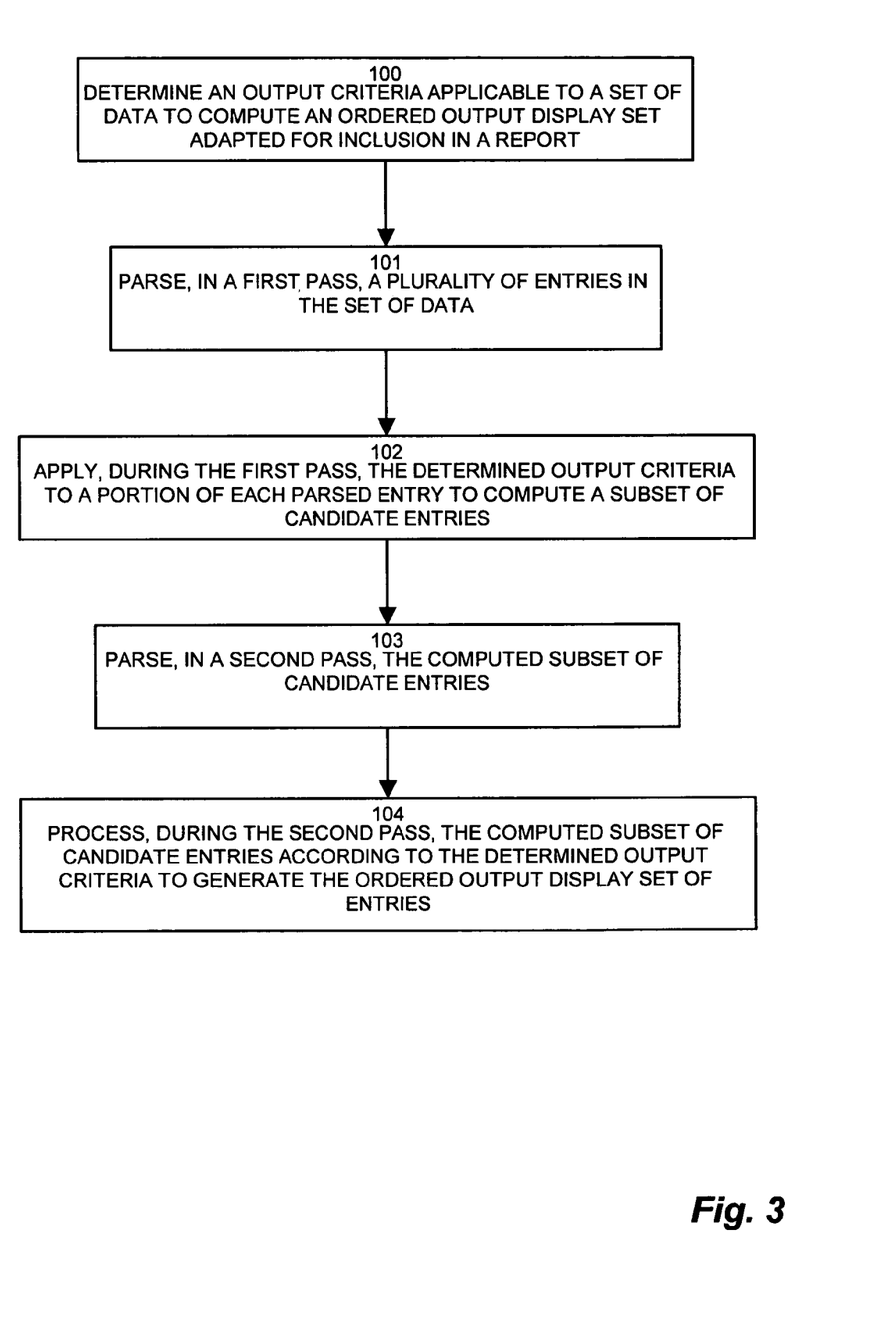
FIG. 3 is a flowchart of processing a data set via the infrastructure monitor.

FIG. 3 is a flowchart for reporting a data set via the infrastructure monitor 14. Referring to FIGS. 1, 2 and 3, the method for organizing and generating report data 22 indicative of a plurality of manageable entities 16 in a storage area network 12 includes, at step 100, determining an output criteria applicable to a set of data to compute an ordered output display set 40 adapted for inclusion in a report. The output criteria 42 determines the content selection and ordering, or arrangement, of the output display set 40 of entries. Typically, the set of data 22 is very large and includes a large number of entries, or records operable to be displayed in a tabular format.

The infrastructure monitor 14 includes a parser 44 for parsing, in a first pass, a plurality of entries in the set of data 22. During the first pass 34, the parser 44 applies the determined output criteria 42 to a portion of each parsed entry to compute a subset of candidate entries 36, as depicted at step 102. The subset candidate entries 36 include the entries for display on a single screen for observation by the user 26. Since the set of data entries 32 is very large, the first pass 34 includes only index fields and arrangement key (i.e. sort) fields, to identify the candidate entries 36.

At step 103 the parser parses, in the second pass 38, the computed subset of candidate entries 36. During the second pass 38, the parser 44 matches the candidate entries 36 from the first pass 34 by matching an index of each the entries 36. The second pass 38 retrieves each of the candidate entries 36 in entirety i.e. all fields. Since the set of candidate entries 36 is substantially smaller than the entire data set 32, the parser 44 has sufficient resources (i.e. memory) to extract the entire record (entry).

During the second pass 38, the parser 44 processes the computed subset of candidate entries 36 according to the determined output criteria 42 to generate the ordered output display set of entries 40, as depicted at step 104. Since the second pass 38 operates on the candidate subset 36, sufficient resources are available for matching, sorting and formatting via the match set handler 50, the sort handler 52, and the format handler 54, described further below. The second pass 38 outputs the ordered output display set 40, for display on a GUI as depicted in FIG. 4 and now described in further detail.

Figure 4:
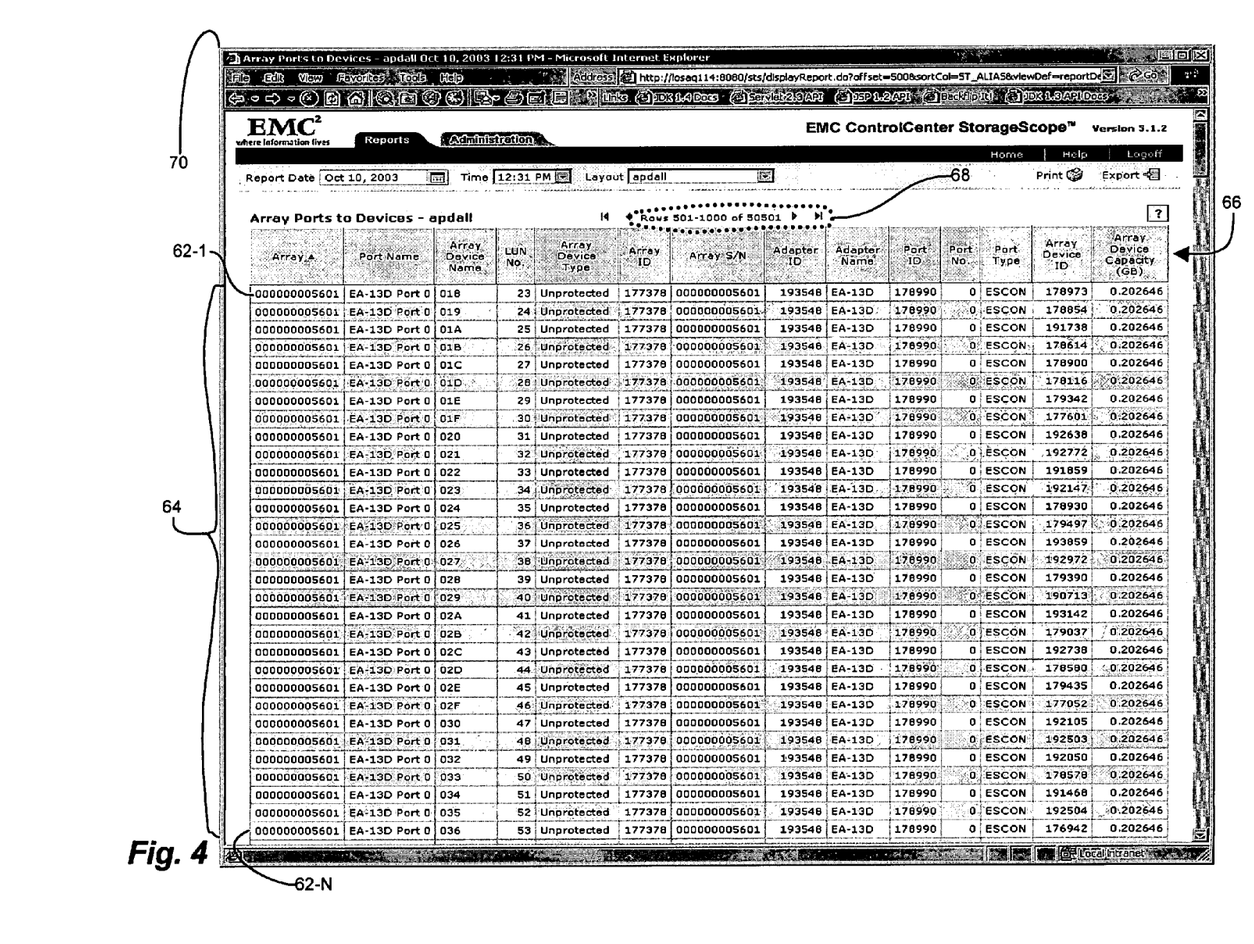
FIG. 4 is an exemplary output screen display for displaying the ordered output display set.
Figure 5:
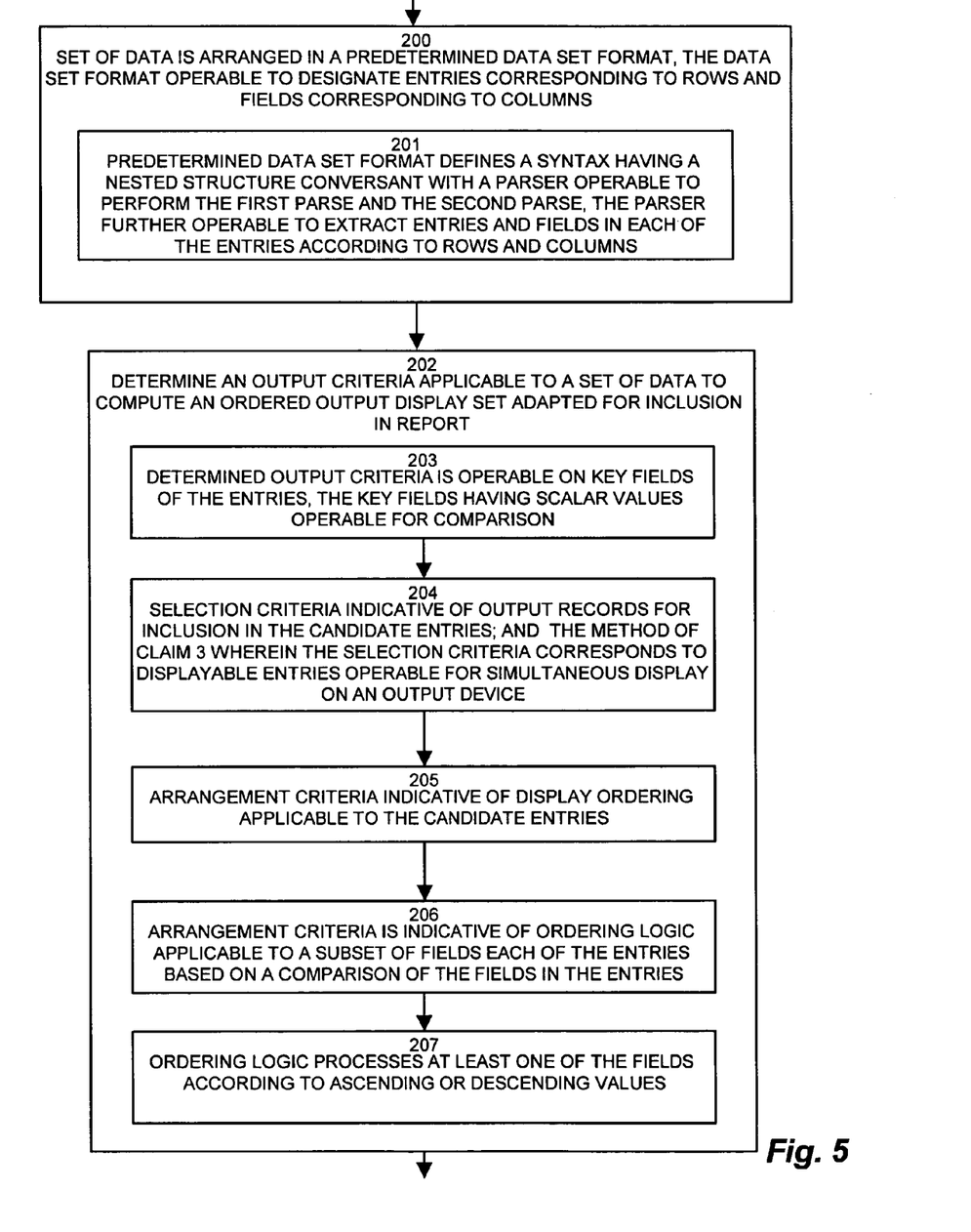
FIGS. 5-8 are a flowchart of the data set reporting of FIG. 3 in greater detail.
Figure 6:
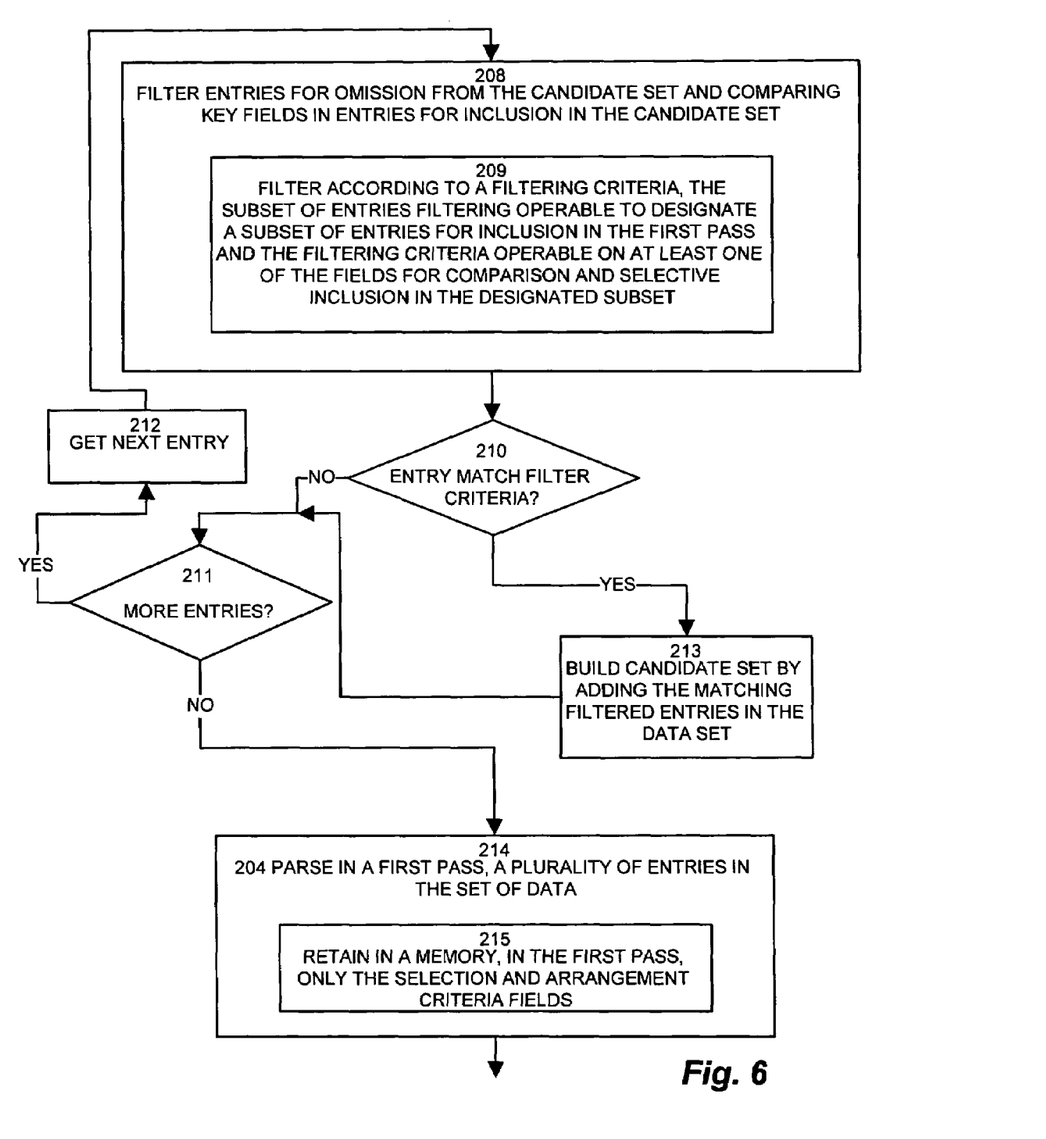
Figure 7:
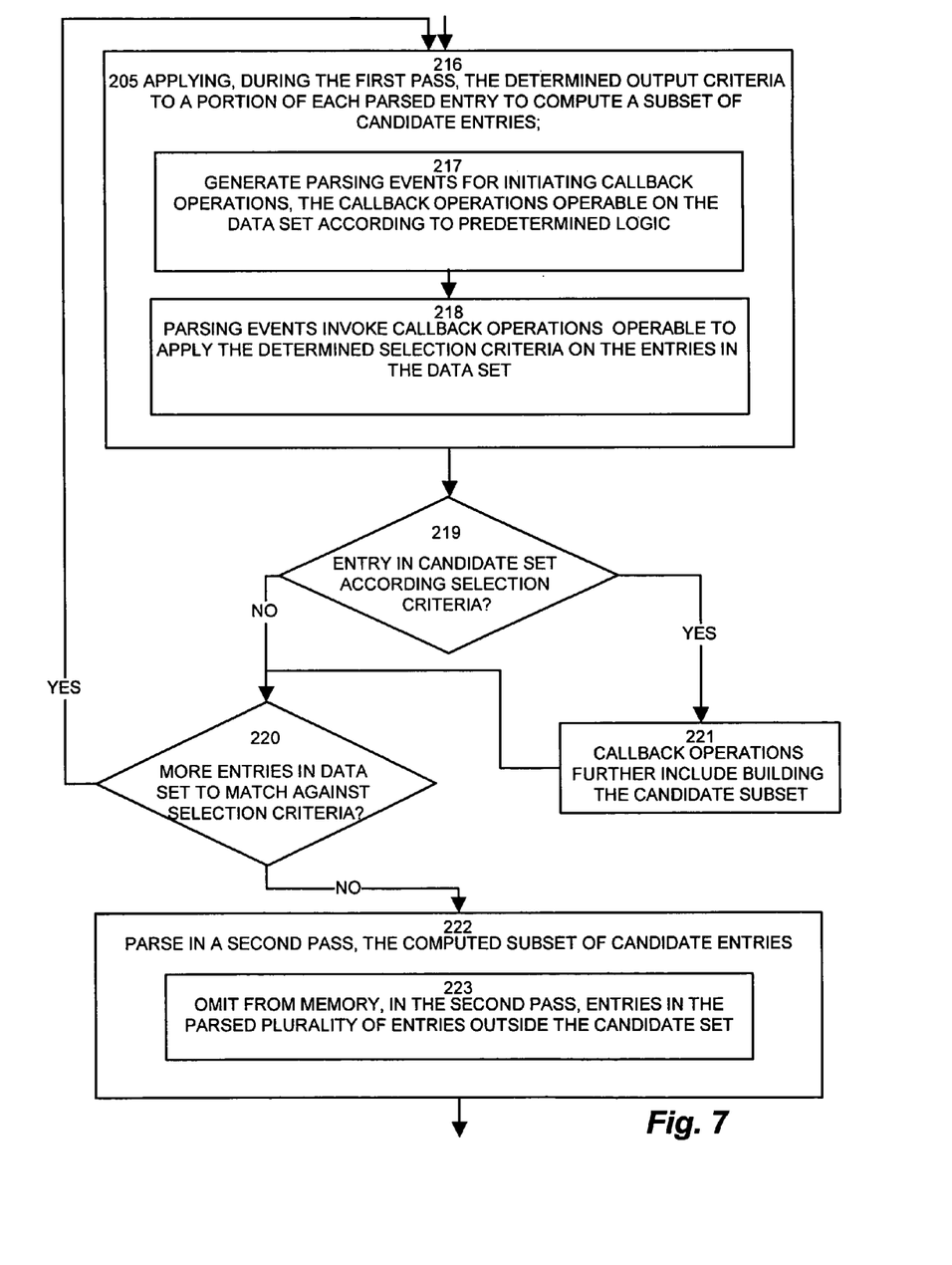
Figure 8:
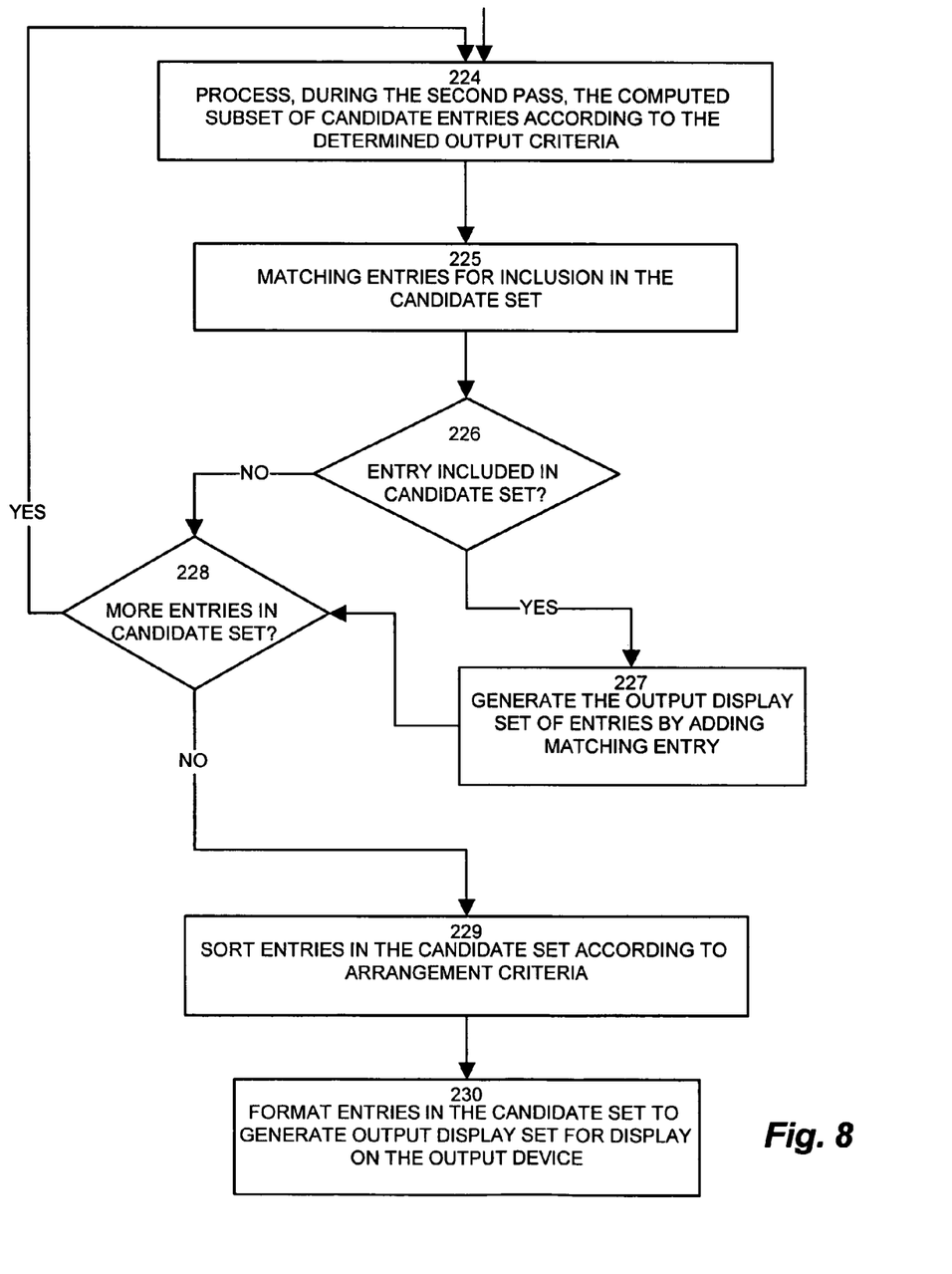

FIG. 4 shows an exemplary output screen 70 of a GUI for displaying the ordered output display set 40. The output screen 70 displays the entries 62-1-62-N (62 generally) of the output display set 40 as a series of rows 64. Each of the entries 62 depicts one or more columns 66 for each field in the entries 62. The displayed rows 64 include entries 62 corresponding to the range 68 as defined by the output criteria 42. As indicated above, typically the range 68 includes a number of entries 62 which is substantially smaller than all the entries 62 of the complete set of data entries 32.

FIGS. 5-8 are a flowchart of the data set reporting of FIG. 3 in greater detail. Referring to FIGS. 2, 4 and 5-8, at step 200, the manageable entities 16 of the SAN 12 store and arrange the report data 22 in the repository 20 according to a predetermined data set format. The predetermined data set format is operable to designate entries corresponding to rows and having fields corresponding to columns. In a particular exemplary implementation, the predetermined data set format defines a syntax having a nested structure conversant with the parser 44. The parser 44 is conversant in the syntax and is operable to perform the first parse and the second parse, the parser further operable to extract entries and fields in each of the entries according to rows and columns, as depicted at step 201. The syntax in the particular exemplary embodiment may be the Extensible Markup Language (XML), and the parser may be a Simple API for XML (SAX) parser, as is known to those of skill in the art, which is particularly operable for efficient parsing of data in an XML format.

A user 26 determines an output criteria applicable to the set of data 22 to compute the ordered output display 40 set adapted for inclusion in a report, as shown at step 202. The user identifies the output criteria to specify which entries 62 (records) of the set 22 to display by identifying the range 68 within the report data set 22. The range 68 identifies a quantity of data sufficient to occupy the display screen 70 from among the number of screens which would be employed to display the data set 22 in entirety. For example, if a screen 70 may display 50 entries, and there are 500 entries in the data set 22, a range may identify screen three of 10 (500/50=10), and thus display entries 101:150 (50*(3−1)+1:50*3). The parser 44 employs the output criteria 42, therefore, to determine which column or columns 66 of the data set 22 to sort on, whether ascending or descending ordering is employed, and which screen 70 of the total screen range to display.

If further detail, at step 203, the user determined output criteria 42 is operable on key fields of the entries 62, in which the key fields have scalar values operable for comparison. Therefore, the output criteria 42 specifies the columns 66 containing key fields, from which the parser 44 identifies the entries 62 for display. The parser identifies, from the output criteria 42, a selection criteria 56 indicative of output records for inclusion in the candidate entries 36. The selection criteria, therefore, corresponds to displayable entries operable for simultaneous display on a single screen 70 on the output device 28, as disclosed at step 204.

At step 205, the parser 44 further computes the arrangement criteria 58 indicative of display ordering applicable to the candidate entries 36. The arrangement criteria 58 specifies, for the entire data set 22, the order of the entries 66. The resulting subset of candidate entries 36 represents only a particular portion, or range 68, within the arrangement criteria 58 as applicable to the entire data set 22. The arrangement criteria 58 is therefore indicative of ordering logic applicable to a subset of fields of each of the entries based on a comparison of the fields in the entries 62, as depicted at step 206. In a particular configuration, at step 207, the ordering logic processes the key fields 66 according to ascending or descending values, i.e. sorts in ascending or descending order. The ordering, therefore, may be a sort based on a single field, or column 66, or in alternate configurations may include more complex ordering logic including multiple columns 66 or other sorting/ordering computations.

The user 26 may specify an optional filter criteria as a part of the output criteria 42, such that the first pass 34 further includes filtering entries for omission from the candidate set 36 and comparing key fields in entries for inclusion in the candidate set 36, as depicted at step 208. Such filtering is according to a filtering criteria, in which the filtering is operable to designate a subset of entries for inclusion in the first pass 34. The filtering criteria is therefore operable on at least one of the fields for comparison and selective inclusion in the designated subset 36, and exclusion of entries 64 not meeting the filtering criteria.

At step 210, the infrastructure monitor 14 performs a check on each entry 62 employing the filter handler 48 to determine if the entry 64 matches the filtering criteria. If the entry 64 does not match the filter criteria, then the infrastructure monitor 14 performs another check at step 211 to determine if there are more entries 62. If there are more entries 62, then the infrastructure monitor 14 gets successive entries, as shown at step 212. If the entry does match, or meet, the filter criteria, then the infrastructure monitor 14 builds the candidate set 36 by adding the matching filtered entries 62 to the set of data entries 32, as depicted at step 213. Control reverts to step 211, as above, until there are no more entries 62.

The infrastructure monitor 14 begins parsing, in the fist pass 34, the plurality of entries 64 in the set of data entries 32, as shown at step 214. To avoid burdening the memory 21 with storing all entries 64 in entirety, the infrastructure monitor retains in the memory 21, during the first pass 34, only the selection 56 and arrangement criteria 58 fields, as depicted at step 215.

In further detail, at step 216, the parser 44 applies, during the first pass 34, the determined output criteria 42 to a portion of each parsed entry 66 to compute a subset of candidate entries 36 corresponding to the entries for display. The build set handler 46 computes, based on the selection criteria 56 discussed above, which entries 66 to include in the candidate entries set 36. The build set handler 46 computes the entries 66 based on the entries 62 in the range 68 corresponding to the desired output screen 70, and by examining the key values in the pertinent columns 66 on the first pass, flags the entries 62 corresponding to the rows 64 in the desired output screen 70.

In the particular exemplary configuration, the parser 44 is a SAX parser operable to generate parsing events when parsing an XML file. The parsing events correspond to content based triggers in the set of data entries 32, such as the end of an entry 66. The SAX parser 44 employs a callback mechanism operable to correlate and invoke certain handlers in response to the parsing events. The handlers are components for performing particular operations. At step 217, accordingly, during the first pass, parsing further comprises generating parsing events for initiating callback operations, the callback operations operable on the data set according to predetermined logic. The parsing events correspond to predetermined syntactical structures, such as the end of a record corresponding to an entry 66 and the callback operations are operable for applying the determined output criteria 42 on the entries 66 in the set of data entries 32.

During the first pass 34, therefore, the SAX parser 44 invokes the build set handler 46, and at step 219, performs a check to determine if the build set handler 46 identifies a particular entry for inclusion in the candidate set 36 according to the selection criteria 56. If the check at step 219 indicates the current entry 66 is not for inclusion, then at step 220 a check performed to determine if there are more entries 62 in the set of data entries 32. If there are, then control reverts to step 216. If the entry 62 is in the candidate set 36, as determined by the check at step 219, then the build set callback handler 46 operation further includes building the candidate set 36 by adding the entry 62 to the candidate set, as depicted at step 221. Control then transfers to step 220 as above.

Following the first pass 34, the parser 44 parses, in a second pass 38, the computed subset of candidate entries 36 from the first pass 34, as depicted at step 222. During the second pass 38, the parser 44 invokes a match set handler 50, thereby omitting from memory 21, in the second pass 38, entries in the parsed plurality of entries outside the candidate set 36, as shown at step 223. At step 224, the parser 44 processes, during the second pass 38, the computed subset of candidate entries 36 according to the determined output criteria 42. The first pass 34 stored only the key fields for comparisons and an index to the entries 62 in the set of candidate entries 36. Accordingly, the second pass 38 matches entries 62 via the indices indicative of the candidate entries 36.

During the first pass, therefore, the selection criteria 56 indicates the lightweight portion of the records 62 to fetch, i.e. the sort fields and an index. Using this lightweight version of the data set 22, the arrangement criteria 38 is employed to determine which entries fall within the selected screen. For example, in a set of 10,000 entries 62, of which a screen displays 50, a selection criteria might indicate entries 5000-5049 of the 10,000 entries 62. The arrangement criteria 58 applies to determine which of the 10,000 entries fall within the entries 5000-5049 based on a sorted arrangement of all 10,000 entries 62.

The second pass 38, therefore, further includes matching entries 62 for inclusion in the candidate set 36, as depicted at step 225. The parser 44 invokes the match set handler 50 to perform a check on each entry 62 to determine if the entry 62 is in the set of candidate entries 36, as shown at step 226. If so, then at step 227, the match set handler 50 generates the output display set 40 of entries by adding the matching entry in entirety (i.e. retrieving all fields, or columns 66, for the entry). The parser 44 then checks for more entries, at step 228, and control reverts to step 224 if there are more entries 62 or to step 229 if there are not additional entries 62.

The parser 44 then invokes the sort handler 52 for the set of complete entries 66 which the match set handler 50 retrieved. The sort handler 52 sorts the complete entries 62 from the candidate set 36 according to the arrangement criteria 58, as depicted at step 229. The sort operation occurs for all fields (columns 66) of the entries 62, but memory 21 usage is not excessive because the sort handler 52 sorts only the entries 62 corresponding to the candidate set 36. The format handler 54 then formats entries in the candidate set 36, to generate the ordered output display set 40 for display on the output device 28, as depicted at step 230.

FIGS. 9A-9E are an example of a data set 22 being processed via the infrastructure monitor of FIG. 3. Referring to FIGS. 9A-9E and 4, the set of data entries 32 includes 10 rows 64 of entries 62-1 . . . 62-10. Four fields A-D are shown in columns 66 for each entry 64. In this exemplary query scenario, each screen 70 displays 3 rows. The user 26 enters an output criteria 42 query requesting screen two, sorted by field C, in descending order. Accordingly, the parser computes that screen two, with a total number of 10 entries 62 and three entries per screen, entries 4-6 define the range 68 of the ordered output display set 40.

Figure 9A:
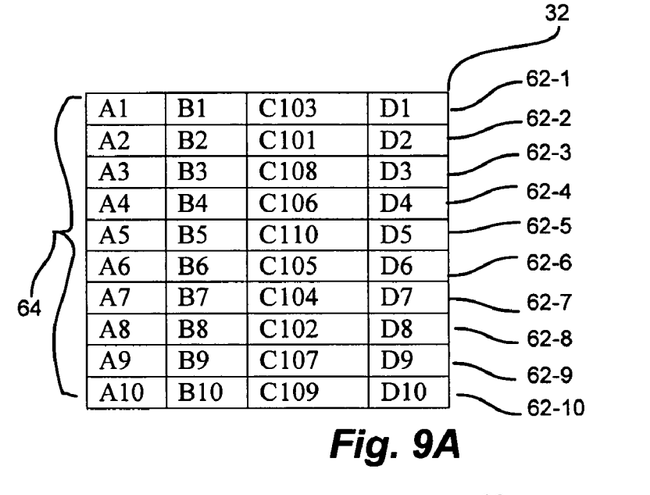
FIGS. 9A-9E are an example of a data set being processed via the infrastructure monitor of FIG. 3.
Figure 9B:
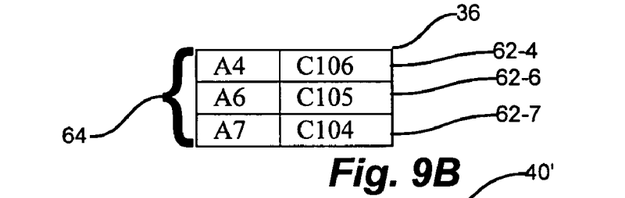

FIG. 9B shows the candidate entries 36 following the first pass 34 and processing by build set handler 46. In this example, the user 36 did not request filtering, hence the filter handler 48 remains idle. The candidate set 36 includes references to the entries 62-4, 62-6, and 62-7 in the set of data entries 32. The candidate set 36 includes the sorting value field C and the index field A, and includes references to the range 68 for the second screen (set) of entries for display (i.e. 4-6) in a descending sort on field C. Therefore, the first pass 34 identifies the entries 62 falling into the range 68 for the particular screen 70 based on a sort of the entire set of data entries 32 on the sort field C. The identified entries 62 need only include an index A and sort value C for the first pass.

Figure 9C:
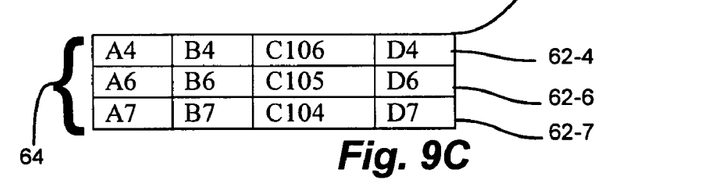

FIG. 9C shows the result 40' of the match set handler 50 during the second pass 38. The match set handler 50 retrieves entire rows 64 for entries 62 identified during the first pass 34 as the candidate set 36 is yet unsorted on the key field C. Since the candidate set 36 identifies only the entries 62 corresponding to the user query and display screen 70, memory 21 efficiency is realized because the match set handler 50 retrieves only entries 62 in the range 68, and not the entire set of data entries 32, when retrieving the full row 64 of fields 66.

Figure 9D:
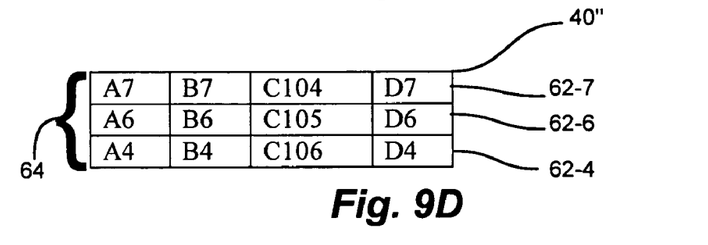
Figure 9E:
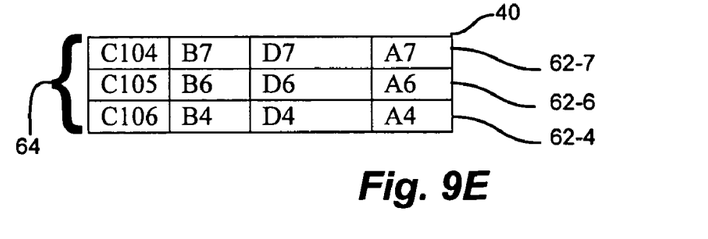

In FIG. 9D, invocation of the sort handler 52 is shown. The entries 62-4, 62-6 and 62-7 are shown as a result 40" of the sort handler 52, following sorting on the key field C. FIG. 9E illustrates the ordered output display set 40, in which the format handler 54 reorganizes the entries 62 for output, such as rearrangement of columns 66, as shown in the example.

The infrastructure monitor 14 then presents the ordered output display set 40 as a output screen 70 to the user 26 on the user display device 28.

In the particular implementation described above, the content data is expressible in an XML format for processing by the SAX parser. The SAX parser is operable to recognize parsing events such as the end of an entry 62, and trigger the corresponding content handler 46, 48, 50, 52, 54 component for the event. Therefore, the content handler components are executable entities implementing the operations described above. The SAX parser is responsive to the SAX API such that the XML data triggers parsing events consistent with the normalized structure represented in the XML data. Further, the content handlers may be conformant to the SAX parser such that the handlers implement the interface specified by the SAX parser. Also, the SAX compliant handlers may interoperate with XSL, as is known to those of skill in the art, which is operable to implement transformations on XML data. Further, a Transformation API for XML (TRAX), which defines interfaces and abstract classes, operates in conjunction with SAX and implements the callback invocation discussed above, and further provides a pipelining invocation format. The pipelining coordinates and serializes the content handler 46, 46, 50, 52, 54 invocation and operation such that the handlers and operations may be expressed sequentially, as in the description above, however the actual implementation occurs in an integrated parallel format which preserves atomicity of synchronous events. Accordingly, the methods and operations discussed above in a logical, sequential progression may be implemented by the XSL callback pipelining mechanism in a parallel manner. Alternatively, other implementations provide large dataset processing via sequential and/or stack-based function invocation without pipelining.

The information distribution system disclosed herein may encompass a variety of alternate deployment environments. In a particular configuration, the exemplary SAN management application discussed may be the StorageScope application, marketed commercially by EMC corporation of Hopkinton, Mass., assignee of the present application.

Those skilled in the art should readily appreciate that the programs and methods for gathering and processing large data sets indicative of a plurality of manageable entities in a storage area network (SAN) as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for gathering and processing large data sets indicative of a plurality of manageable entities in a storage area network (SAN) has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of organizing and generating report data renderable on a graphical user output device indicative of a plurality of manageable entities in a managed information network comprising:
   determining an output criteria applicable to a set of data, the set of data having entries including fields, to compute an output display set adapted for inclusion in a report, the determined output criteria including:
      a selection criteria indicative of output records for inclusion in a set of candidate entries selected from the entries; and
      an arrangement criteria indicative of display formatting applicable to the candidate entries;
   parsing, in a first pass, a plurality of entries in the set of data;
   applying, during the first pass, the selection criteria to identify a subset of entries from among the entries in the set of data for inclusion as output records in the report, the selection criteria applying a filtering criteria indicating the fields in the entries used for an output display set to compute the subset of candidate entries;
   the arrangement criteria indicating a logical arrangement order applicable to the subset of candidate entries identified from the first pass;
   retaining in a memory, in the first pass, only the fields used in the selection and arrangement criteria;
   parsing, during the second pass, the computed subset of candidate entries, the second pass performed on the same set of data unmodified from the first pass;
   omitting from a memory, in the second pass, entries in the parsed plurality of entries outside the subset of candidate entries;
   processing, during the second pass, the computed subset of candidate entries according to the arrangement criteria to generate the output display set of entries on the graphical user output device;
   the determined output criteria operable on key fields of the entries, the key fields having scalar values operable for comparison, and the set of data being arranged in a predetermined data set format, the data set format operable to designate entries corresponding to rows and fields corresponding to columns.

2. The method of claim 1 further comprising retaining in a memory, in the first pass, only the selection and arrangement criteria fields.

3. The method of claim 1 wherein the selection criteria corresponds to displayable entries operable for simultaneous display on an output device.

4. The method of claim 1 wherein the arrangement criteria is indicative of ordering logic applicable to a subset of fields each of the entries based on a comparison of the fields in the entries.

5. The method of claim 4 wherein the ordering logic processes at least one of the fields according to ascending or descending values.

6. The method of claim 1 wherein the predetermined data set format defines a syntax having a nested structure conversant with a parser operable to perform the first parse and the second parse, the parser further operable to extract entries and fields in each of the entries according to rows and columns.

7. The method of claim 1 wherein parsing further comprises generating parsing events for initiating callback operations, the callback operations operable on the data set according to predetermined logic.

8. The method of claim 7 wherein the parsing events correspond to predetermined syntactical structures, and the callback operations are operable for applying the determined output criteria on the entries in the data set.

9. The method of claim 8 wherein the callback operations further include building the candidate set, filtering the entries in the data set, matching entries in the candidate set, sorting entries in the candidate set, and formatting entries in the candidate set.

10. The method of claim 1 wherein the first pass further comprises filtering entries for omission from the candidate set and comparing key fields in entries for inclusion in the candidate set.

11. The method of claim 1 wherein the second pass further comprises matching entries for inclusion in the candidate set, sorting entries in the candidate set, and formatting entries in the candidate set for display on the output device.

12. A data management device for organizing and generating report data indicative of a plurality of manageable entities renderable on a graphical user output device in a storage area network (SAN) comprising:
   an infrastructure monitor operable for receiving an output criteria applicable to a set of data, the set of data having entries including fields, to compute an ordered output display set adapted for inclusion in a report, the received output criteria including:
      a selection criteria to identify a subset of entries from among the entries in the set of data for inclusion as output records in the report, the selection criteria applying a filtering criteria indicating the fields in the entries used for an output display set to compute a subset of candidate entries; and
      an arrangement criteria indicative of a logical arrangement order applicable to the subset of candidate entries identified from the first pass,
   the set of data arranged in a predetermined data set format, the data set format operable to designate entries corresponding to rows and fields corresponding to columns;
   a parser in the infrastructure monitor for parsing, in a first pass, a plurality of entries in the set of data, the parser operable to omit from a memory, in the second pass, entries in the parsed plurality of entries outside the subset of candidate entries;
   a first handler in the parser for applying, during the first pass, the selection criteria to identify a subset of entries from among the entries in the set of data for inclusion as output records in the report, the selection criteria applying a filtering criteria indicating the fields in the entries used for an output display set to compute the subset of candidate entries;
   a memory for retaining, in the first pass, only the selection and arrangement criteria fields;
   a second handler in the parser for applying, during a second pass, the arrangement criteria to the subset of candidate entries, the arrangement criteria indicating a logical arrangement order applicable to the subset of candidate entries identified from the first pass, the parser operable to process, during the second pass, the computed subset of candidate entries according to the determined output criteria to generate the ordered output display set of entries on the graphical user output device;
   the determined output criteria operable on key fields of the entries, the key fields having scalar values operable for comparison, and the set of data being arranged in a predetermined data set format, the data set format operable to designate entries corresponding to rows and fields corresponding to columns.

13. The data management device of claim 12 wherein the parser is operable to retain, in a memory, in the first pass, only the selection and arrangement criteria fields.

14. The data management device of claim 12 wherein the selection criteria corresponds to displayable entries operable for simultaneous display on an output device.

15. The data management device of claim 12 wherein the arrangement criteria is indicative of ordering logic applicable to a subset of fields each of the entries based on a comparison of the fields in the entries.

16. The data management device of claim 15 wherein the ordering logic is operable to process at least one of the fields according to ascending or descending values.

17. The data management device of claim 12 wherein the predetermined data set format defines a syntax having a nested structure conversant with a parser operable to perform the first parse and the second parse, the parser further operable to extract entries and fields in each of the entries according to rows and columns.

18. The data management device of claim 12 further comprising a filter handler operable according to a filtering criteria, the filtering operable to designate a subset of entries for inclusion in the first pass and the filtering criteria operable on at least one of the fields for comparison and selective inclusion in the designated subset.

19. The data management device of claim 12 wherein parsing is operable to generate parsing events for initiating callback operations, the callback operations operable to invoke handlers for performing operations on the data set according to predetermined logic.

20. The data management device of claim 19 wherein the parsing events correspond to predetermined syntactical structures, and the callback operations are operable for applying the determined output criteria on the entries in the data set.

21. A method for efficient memory usage for organizing and generating report data indicative of a plurality of manageable entities in a storage area network (SAN) comprising:

determining, via a user input request, an output criteria applicable to a set of data, the set of data having entries including fields, to compute an ordered output display set adapted for inclusion in a report;

parsing, by a build set handler, in a first pass, a plurality of entries in the set of data;

filtering according to a filtering criteria, the filtering operable to designate a subset of entries for inclusion in the first pass and the filtering criteria operable on at least one of the fields for comparison and selective inclusion in the designated subset;

retrieving, during the parsing, a portion of each of the plurality of entries, the filtering criteria defining the portion as fields in the entries deterministic of the entries in the output display set, wherein the parsed entries in the first pass are inoperably large for concurrent memory residence;

applying, during the first pass, a selection criteria in the determined output criteria, the selection criteria for identifying a subset of entries from among the entries in the set of data for inclusion as output records in the report, the selection criteria applying a filtering criteria indicating the fields in the entries used for an output display set to compute the subset of candidate entries, the first pass further comprising filtering entries for omission from the candidate set and comparing key fields in entries for inclusion in the candidate set;

retaining in a memory, in the first pass, only the selection and arrangement criteria fields;

parsing, by a match set handler, in a second pass, the computed subset of candidate entries to identity entries in the data set corresponding to the portions of entries in the candidate entries, the second pass applying an arrangement criteria indicating a logical arrangement order applicable to the subset of candidate entries identified from the first pass and performed on the same set of data unmodified from the first pass;

retrieving, by the match set handler, the entire entry corresponding to each of the portion of the entry in the candidate entries;

processing, by a sort handler, during the second pass, the computed subset of candidate entries according to the determined output criteria to generate complete entries of the entries in the candidate set, wherein the parsed entries of the second pass require less memory than the first pass such that the parsed entries of the second pass are stored simultaneously in memory, the second pass further comprising matching entries for inclusion in the candidate set, sorting entries in the candidate set, and formatting entries in the candidate set for display on the output device;

formatting, by a format handler, the processed computed subset of entries to generate the output display set of entries on a graphical user output device, the output display set of entries corresponding to the computed subset of entries and ordered according to the ordering logic;

omitting from the memory, during the second pass, entries in the data set outside the output display set of entries;

the determined output criteria operable on key fields of the entries, the key fields having scalar values operable for comparison, and the set of data being arranged in a predetermined data set format, the data set format operable to designate entries corresponding to rows and fields corresponding to columns.

22. A computer program product having a computer readable medium operable to store computer program logic embodied in an encoded set of processor based instructions encoded thereon for performing, via a processor responsive to the instructions, organizing and generating report data renderable on a graphical user output device indicative of a plurality of manageable entities in a managed information network comprising:

computer program code for determining an output criteria applicable to a set of data to compute an ordered output display set adapted for inclusion in a report, the set of data having entries including fields, the determined output criteria including:

a selection criteria for identifying, in a first pass, a subset of entries from among the entries in the set of data for inclusion as output records in the report, the selection criteria applying a filtering criteria indicating the fields in the entries used for an output display set to compute the subset of candidate entries; and an arrangement criteria indicative of display formatting applicable to the candidate entries, the arrangement criteria operable in a second pass for indicating a logical arrangement order applicable to the subset of candidate entries identified from the first pass;

computer program code for parsing, in the first pass, a plurality of entries in the set of data;

computer program code for applying, during the first pass, the determined output criteria to a portion of each parsed entry to compute a subset of candidate entries, the output criteria defining the portion as fields in the entries deterministic of the entries in the output records;

retaining in a memory, in the first pass, only the output criteria fields;

computer program code for parsing, in the second pass, the computed subset of candidate entries, the second pass performed on the same set of data unmodified from the first pass;

computer program code for omitting from a memory, in the second pass, entries in the parsed plurality of entries outside the candidate set; and computer program code for processing, during the second pass, the computed subset of candidate entries according to the determined output criteria to generate the ordered output display set of entries on the graphical user output device;

the determined output criteria operable on key fields of the entries, the key fields having scalar values operable for comparison, and the set of data being arranged in a predetermined data set format, the data set format operable to designate entries corresponding to rows and fields corresponding to columns.

23. A data management device for organizing and generating report data indicative of a plurality of manageable entities renderable on a graphical user output device in a storage area network (SAN) comprising:

means for determining an output criteria applicable to a set of data, the set of data having entries including fields, to compute an ordered output display set adapted for inclusion in a report, the determined output criteria including:

a selection criteria to identify, in a first pass, a subset of entries from among the entries in the set of data for inclusion as output records in the report, the selection criteria applying a filtering criteria indicating the fields in the entries used for an output display set to compute the subset of candidate entries; and an arrangement criteria indicative of display formatting applicable to the candidate entries, the arrangement criteria operable in a second pass for indicating a logical arrangement order applicable to the subset of candidate entries identified from the first pass;

means for parsing, in the first pass, a plurality of entries in the set of data;

means for applying, during the first pass, the determined output criteria to a portion of each parsed entry to compute a subset of candidate entries, the output criteria defining the portion as fields in the entries deterministic of the entries in the output records;

retaining in a memory, in the first pass, only the output criteria fields;

means for parsing, in the second pass, the computed subset of candidate entries, the second pass performed on the same set of data unmodified from the first pass;

means for omitting from a memory, in the second pass, entries in the parsed plurality of entries outside the candidate set; and means for processing, during the second pass, the computed subset of candidate entries according to the determined output criteria to generate the ordered output display set of entries in a tangible medium of expression on the graphical user output device;

the determined output criteria operable on key fields of the entries, the key fields having scalar values operable for comparison, and the set of data being arranged in a predetermined data set format, the data set format operable to designate entries corresponding to rows and fields corresponding to columns.

24. A method for organizing and generating report data indicative of a plurality of manageable entities renderable on a graphical user output device in a managed information network comprising:

determining an output criteria applicable to a set of data, the set of data having entries including fields, to compute an ordered output display set adapted for inclusion in a report, the determined output criteria including:

a selection criteria operable during a first pass to identify a subset of entries from among the entries in the set of data for inclusion as output records in the report, the selection criteria applying a filtering criteria indicating the fields in the entries used for an output display set to compute a subset of candidate entries; and an arrangement criteria operable during a second pass for indicating a logical arrangement order applicable to the subset of candidate entries identified from the first pass for determining display formatting applicable to the candidate entries;

parsing, in a first pass, a plurality of entries in the set of data;

retaining in a memory, in the first pass, only the fields referenced by the selection and arrangement criteria;

applying, during the first pass, the determined output criteria to a portion of each parsed entry to compute a subset of candidate entries, the output criteria defining the portion as fields in the entries deterministic of the entries in the output records;

parsing, in the second pass, the computed subset of candidate entries, the parsed entries of the second pass requiring less memory than the first pass such that the parsed entries of the second pass are stored simultaneously in memory, the second pass performed on the same set of data unmodified from the first pass;

omitting from a memory, in the second pass, entries in the parsed plurality of entries outside the candidate set; and processing, during the second pass, the computed subset of candidate entries according to the determined output criteria to generate the ordered output display set of entries on a graphical user output device;

the determined output criteria operable on key fields of the entries, the key fields having scalar values operable for comparison, and the set of data being arranged in a predetermined data set format, the data set format operable to designate entries corresponding to rows and fields corresponding to columns.

25. The method of claim 24 wherein parsing further comprises generating parsing events for initiating callback operations, the callback operations operable on the data set according to predetermined logic, the parsing events corresponding to predetermined syntactical structures, and the callback operations are operable for applying the determined output criteria on the entries in the data set, wherein the callback operations further include building the candidate set, filtering the entries in the data set, matching entries in the candidate set, sorting entries in the candidate set, and formatting entries in the candidate set.

26. The method of claim 25 wherein the parsed entries in the first pass are inoperably large for concurrent memory residence.

* * * * *